E. B. LITTLE.
HARVESTING MACHINE.
APPLICATION FILED NOV. 23, 1911.

1,065,695.

Patented June 24, 1913.

2 SHEETS—SHEET 1.

WITNESSES:
Thos. W. Riley
M. Newcomb

INVENTOR
E. B. Little
BY W. J. Fitz Gerald Co.
Attorneys

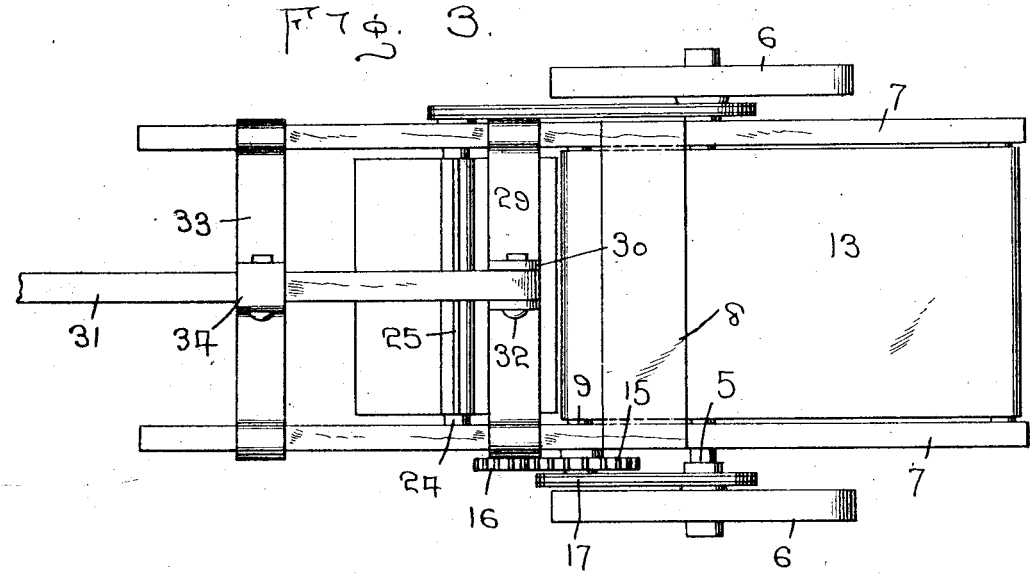
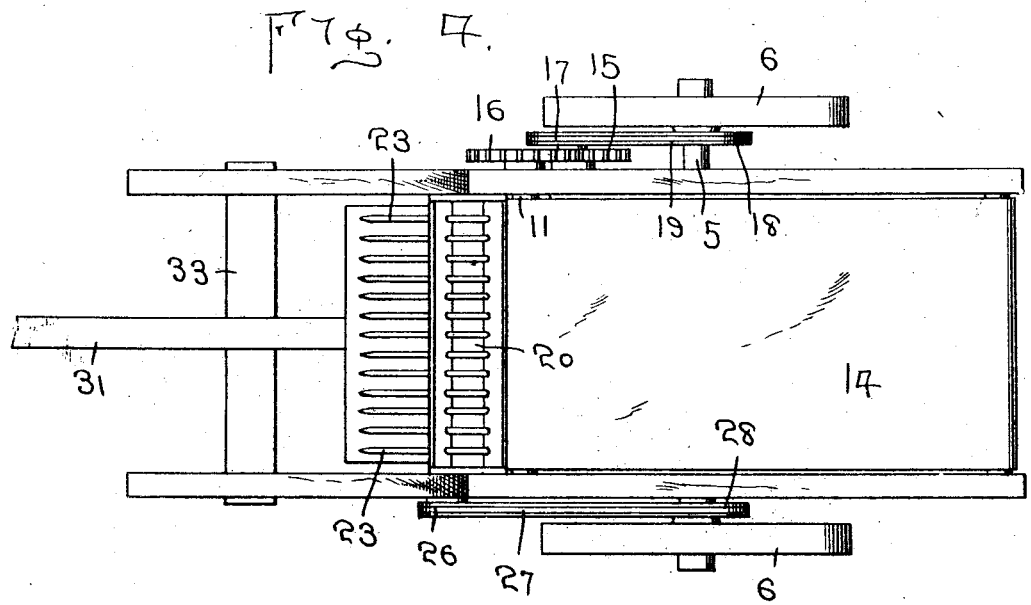

UNITED STATES PATENT OFFICE.

ELI B. LITTLE, OF ROOSEVELT, OKLAHOMA.

HARVESTING-MACHINE.

1,065,695. Specification of Letters Patent. Patented June 24, 1913.

Application filed November 23, 1911. Serial No. 661,929.

*To all whom it may concern:*

Be it known that I, ELI B. LITTLE, a citizen of the United States, residing at Roosevelt, in the county of Kiowa and State of Oklahoma, have invented certain new and useful Improvements in Harvesting - Machines; and I do hereby declare the following to be a full, clear, and exact description of the invention, such as will enable others skilled in the art to which it appertains to make and use the same.

My invention relates to new and useful improvements in harvesting machines and more particularly to a machine adapted to be used for gathering cotton bolls.

The object of my invention is to provide a device adapted to be drawn over a row of cotton plants and having means adapted to remove the bolls from the plants, and, a further object of my invention is to provide means whereby the device may be used to gather the bolls from plants of different heights.

Other objects and advantages will be hereinafter made clearly apparent in the specification and pointed out in the claim.

In the accompanying drawings I have shown the preferred form which my invention may take.

Figure 1:
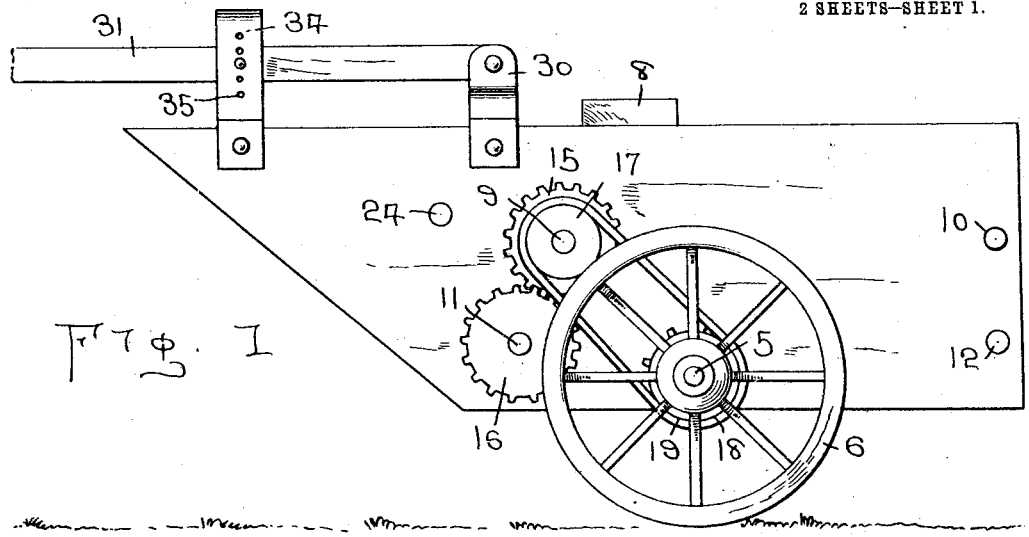
Figure 2:
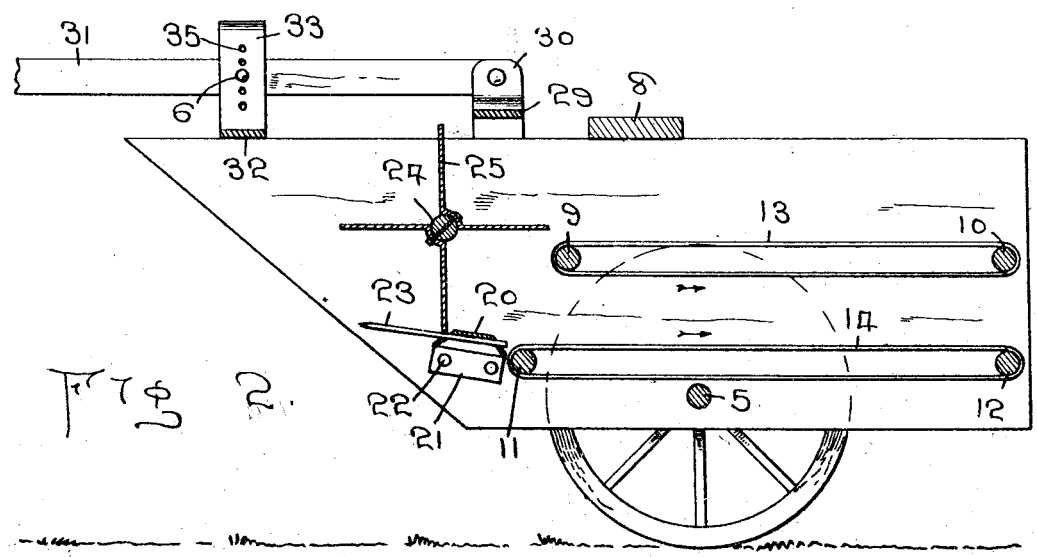

In said drawings, Figure 1 is a side elevation of my cotton boll gathering machine. Fig. 2 is a longitudinal sectional view therethrough. Fig. 3 is a top plan view thereof, and, Fig. 4 is a bottom plan view thereof.

Referring to the drawings in which similar reference numerals designate corresponding parts throughout the several views, 5 is a supporting axle, which is provided at its ends with suitable supporting wheels 6. Mounted upon the axle is a frame comprising side members 7 and one or more transversely arranged strengthening beams 8. Journaled in the side members 7 are two sets of rollers 9—10 and 11—12, said side rollers being arranged in horizontal directions, as shown in Fig. 2. Belts 13 and 14 are carried by the sets of rollers 9—10 and 11—12, respectively, for a purpose hereinafter more clearly set forth.

Gears 15 and 16 are mounted upon one end of the shafts 9 and 11, respectively, and said gears are adapted to intermesh. The shaft 9 is also provided with a drum 17, in alinement with a drum 18 secured to the adjacent portion of the axle 5. A belt 19 is disposed upon said drums so that when the machine is drawn forward power will be transmitted to the shafts 9 and 11 and the belts thereon will be caused to move in the directions indicated by the arrows in Fig. 2.

Secured transversely to the main frame at a point in front of the roller 11, is a finger-bar comprising a supporting frame 20 and fingers 23. The frame 20 is preferably formed from sheet metal, the ends of which are downwardly directed to form anchoring plates 21. The plates 21 are provided with apertures, through which bolts 22 are adapted to be passed to secure said plates to the side members of the machine.

The sides of the supporting frame are preferably downwardly directed, as clearly shown in Fig. 2, and said sides are provided with a plurality of alining apertures, through which forwardly directed prongs or fingers 23 are adapted to extend. The free ends of the fingers are preferably pointed so that the stalks of the plants, over which the machine is drawn will readily pass into the spaces between said fingers.

Journaled in the sides 7, above the supporting frame 20, is a shaft 24, upon which are mounted a plurality of blades 25, the ends of said blades extending adjacent the sides of the fingers 23. One end of the shaft 24 is provided with a drum 26, adapted to receive a belt 27, the other end of said belt extending over a drum 28 secured to the adjacent portion of the axle 5, so that said shaft will be rotated when the machine is drawn forward.

Extending transversely of the upper portion of the frame is a bar 29 having a pair of upwardly extending ears 30 near its center. A tongue 31, by means of which the machine may be drawn forward, has its rear end pivotally connected between the ears 30 by means of a bolt 32 extended through said ears and through the end of said tongue. Arranged a distance in front of the bar 29 is a bar 33, secured at its ends to the side members 7 and having its central portion bent upwardly to form an inverted U-shaped portion 34. The portion 34 is provided with a plurality of holes 35 and a bolt 36 is adapted to extend through one of said holes and through a hole formed in the adjacent portion of the tongue. By this arrangement the height of the fingers 23 above the ground may be regulated so that said fingers may be positioned so that the machine may be used to gather bolls from plants of different heights.

In operation the machine is drawn astraddle of a row of plants and the stalks carrying the bolls will pass between the fingers 23. The blades 25 will be rapidly rotated and the bolls will be caught between the supporting frame 20 and the ends of said blades and will be severed from their stalks and directed upon the belt 14.

As indicated in Fig. 2, the belts 13 and 14 are spaced a slight distance so that the bolls, when severed, will be caught between the adjoining surface of said belts and carried rearwardly of the frame. The rear portion of the frame may be constructed so as to provide a space for the receptacle of the bolls. I prefer, however, to connect a wagon, truck, or other suitable vehicle, (not shown) to the rear of the frame so that the bolls will be projected thereinto from the belts. When a wagon is connected to the frame and has been filled, the same may be disconnected and a new wagon connected to the frame, when the same may be likewise filled.

From the foregoing description it will be seen that I have provided a machine, which may be employed to gather bolls from plants of varying heights. It will further be seen that with my device the bolls will be rapidly severed from the plants and be carried to the rear of the machine, where the same may be directed into a suitable receptacle.

While I have shown the preferred form of my invention, I desire it to be understood that I may make certain modifications therein without departing from the spirit and scope of my invention.

What I claim as new is:

A pod or boll harvester comprising a main frame and a finger bar carried transversely thereof and within the same, said finger bar consisting of sheet metal with downwardly turned end flanges and front and rear inclined apertured edge portions, said flanges being secured to the opposite inner walls of the main frame, and fingers seated in the apertures of the inclined edge portions.

In testimony whereof I have signed my name to this specification in the presence of two subscribing witnesses.

ELI B. LITTLE.

Witnesses:
J. G. HUGHES,
W. R. GRAHAM.